United States Patent
Ali et al.

(10) Patent No.: US 8,841,999 B2
(45) Date of Patent: Sep. 23, 2014

(54) DECELERATION RATE INDICATOR APPARATUS

(75) Inventors: Mohammad Faizal Ali, Oceanside, CA (US); Randall Jay Redding, Buckley, WA (US)

(73) Assignee: Vectolabs, LLC, Oceanside, CA (US)

( * ) Notice: Subject to any disclaimer, the term of this patent is extended or adjusted under 35 U.S.C. 154(b) by 72 days.

(21) Appl. No.: 13/167,693

(22) Filed: Jun. 24, 2011

(65) Prior Publication Data

US 2012/0218098 A1    Aug. 30, 2012

Related U.S. Application Data

(60) Provisional application No. 61/358,896, filed on Jun. 26, 2010.

(51) Int. Cl.
| | |
|---|---|
| *B60Q 1/50* | (2006.01) |
| *B60Q 1/26* | (2006.01) |
| *B60Q 1/44* | (2006.01) |
| *G08B 5/22* | (2006.01) |
| *F21V 21/084* | (2006.01) |
| *G06F 7/70* | (2006.01) |

(52) U.S. Cl.
CPC ............. *B60Q 1/447* (2013.01); *B60Q 1/2673* (2013.01); *B60Q 1/2676* (2013.01); *B60Q 1/2696* (2013.01)

USPC ...... 340/467; 340/815.45; 340/479; 362/105; 701/70

(58) Field of Classification Search
USPC .................................................. 340/467, 479
See application file for complete search history.

(56) References Cited

U.S. PATENT DOCUMENTS

| | | | |
|---|---|---|---|
| 2004/0227646 A1* | 11/2004 | Henry ........................... | 340/902 |
| 2007/0247296 A1* | 10/2007 | Moore et al. .................. | 340/467 |
| 2008/0111673 A1* | 5/2008 | Roberts ......................... | 340/479 |
| 2009/0276131 A1* | 11/2009 | Braunberger et al. .......... | 701/70 |
| 2009/0278678 A1* | 11/2009 | Krotkov ........................ | 340/467 |
| 2010/0082249 A1* | 4/2010 | Ando et al. ................... | 701/211 |
| 2010/0253501 A1* | 10/2010 | Gibson ......................... | 340/475 |

* cited by examiner

*Primary Examiner* — Jack K Wang
(74) *Attorney, Agent, or Firm* — Jackson Walker L.L.P.; Christopher J. Rourk

(57) ABSTRACT

An apparatus for providing deceleration rate information of a user operating a vehicle is disclosed. The apparatus includes a unit including an accelerometer, a processor, and a lighting mechanism. The processor receives from the accelerometer deceleration info of the vehicle and variably adjusts at least one aspect of the lighting mechanism, thereby quantitatively signaling the deceleration rate to a driver of a following vehicle. The unit may be mounted on an article of clothing, a bag, or the vehicle itself.

20 Claims, 10 Drawing Sheets

DECELERATION RATE INDICATOR APPARATUS

CLAIM OF PRIORITY UNDER 35 U.S.C. §119

The present application claims priority to U.S. Provisional Application No. 61/358,896, entitled "Deceleration rate indicator system," filed on Jun. 26, 2010, and hereby expressly incorporated by reference herein.

BACKGROUND

1. Field

The present disclosure relates to an indicator apparatus that flashes at a frequency correlating to the rate of deceleration, thereby quantitatively signaling a deceleration rate to a driver of a following vehicle. This apparatus is designed to be used in addition to conventional brake lights. The disclosure exploits the awareness of the accepted meaning of flashing lights as well as improved visibility to provide a safer signaling system.

This relates to braking lights, specifically to a vehicle application that informs a following vehicle of a deceleration rate of the user's vehicle. This apparatus is especially beneficial for motorcycle riders and bicyclists who are especially vulnerable and tend to be less visible. Motorcycle brake lights tend to be small and lower to the ground. In addition, motorcyclists use engine braking more than drivers of other types of vehicles. In one embodiment of the disclosure, a motorcycle jacket includes a deceleration rate indicator apparatus having a lighting mechanism that serves as a running light as well as deceleration indicator. The embodiment provides added advantage such that it will be higher up than a light mounted on a motorcycle. This added visual cue improves the visibility of the riders. The deceleration rate indicator apparatus may take on any appropriate shape or configuration, such that users may proudly display their favorite logo, emblems, or advertisement while making them more visible.

Braking indication by measuring deceleration rate complements the monitoring application of brakes, as the apparatus measures actual deceleration instead of application of brakes. This provides user the ability to inform the following vehicle of the degree of danger involved. This provides extra time for following drivers to react as braking is usually preceded by releasing throttle or shifting down in many cases. The specification of this apparatus centers around the application of motorcycle jacket but its application can also be extended to the vehicle itself or other apparel and or accessories.

2. Description of Prior Art

The following table some prior art that appears relevant:

Description of Prior Arts Relating to Signal Jacket

U.S. Pat. No. 6,925,654 discloses a safety signal jacket for riders of non-enclosed vehicles. The apparatus is to be activated by the way of electrical communication.

U.S. Pat. No. 6,679,615 discloses a lighted signaling system for the user of a vehicle that contains light sources that illuminate in a pattern selected from the group consisting of advertisements, logos, names, and trade names.

U.S. Publ. No. US2007/0063831 discloses an indication mechanism that is attached to a garment of the rider. The indication mechanism has two banks of LED arrays and a wireless radio receiver. The wireless system is linked to the wiring system of the motorcycle light system. When the signal interface detects a signal sent through the wiring system of the motorcycle the signal interface sends a signal via the transmitter to the receiver of the indication mechanism. Alternately, rather than utilizing a signal interface, the indication mechanism may include an accelerometer to detect deceleration of the bicycle.

Description of Prior Art Relating to Brake Lights

U.S. Pat. No. 6,525,652 describes a system which will automatically activate the conventional vehicle brake system under conditions of downshifting causing deceleration. In this respect, the deceleration rate indicator system departs from conventional system and in doing so informs driver of following vehicle the rate of deceleration. This system uses an accelerometer with tachometer to provide rate of deceleration. It requires communication with the vehicle.

U.S. Pat. No. 6,943,677 describes a two region brake light. One region is the conventional braking and another is modulated to increase perception. It uses a time-out to avoid irritating flashing in stop and go traffic i.e. it is disabled in stop and go traffic.

U.S. Pat. No. 4,918,424 is a two stage brake light system. One is a braking light and the other is stopping light.

SUMMARY

Aspects and embodiments of the present disclosure provide an improved method to signal deceleration and braking. Deceleration typically precedes braking as driver downshifts and closes the throttle of the vehicle. An apparatus that indicates the rate of deceleration and warns of stoppage for users of non-enclosed vehicles, keeps the user safer while braking on the road and warns a following driver when the user is stopped. (e.g., at a stop sign, traffic light). The system is self contained and does not require any connection or modifications to the vehicle. The only maintenance required is to keep the removable battery charged.

These, as well as other components, steps, features, benefits and advantages of the present disclosure, will now

| Pat. No. | Title | Issue Date | Patentee |
|---|---|---|---|
| U.S. Pat. No. 2,474,610 | Quantitative deceleration indicator | Jun. 28, 1949 | Elton P Wunsch |
| U.S. Pat. No. 6,925,654 | Safety Signal Jacket for riders of non-enclosed vehicles. | Aug. 09, 2005 | Shelton Gamini De Silva |
| U.S. Pat. No. 6,679,615 | Lighted signaling system for user of vehicle | Jan. 20, 2004 | Raliegh A. Spearing |
| US2007/0063831 | Signaling safety system | Mar. 22, 2007 | Barry Perkinds, Joseph Cordina |
| U.S. Pat. No. 6,525,652 | Downshifting warning system | Feb. 25, 2003 | Clayton S. Smith |
| U.S. Pat. No. 6,943,677 | Modulated Intensity Flasher for Vehicle Brake Light with Lockout | Sep. 13, 2005 | Clyde H Boyer, Edward J. Stropkay, Robert C. Morris |
| U.S. Pat. No. 4,918,424 | Two-stage brake light system | Apr. 17, 1990 | R Douglas Sykora | become clear from a review of the following detailed description of illustrative embodiments, the accompanying drawings, and the claims.

BRIEF DESCRIPTION OF THE DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

DETAILED DESCRIPTION

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

This disclosure seeks to exploit the awareness that drivers already make with flashing light as it grabs attention. An extension to that idea is drivers associate increased urgency with increased rate of flashing light.

Figure 1:
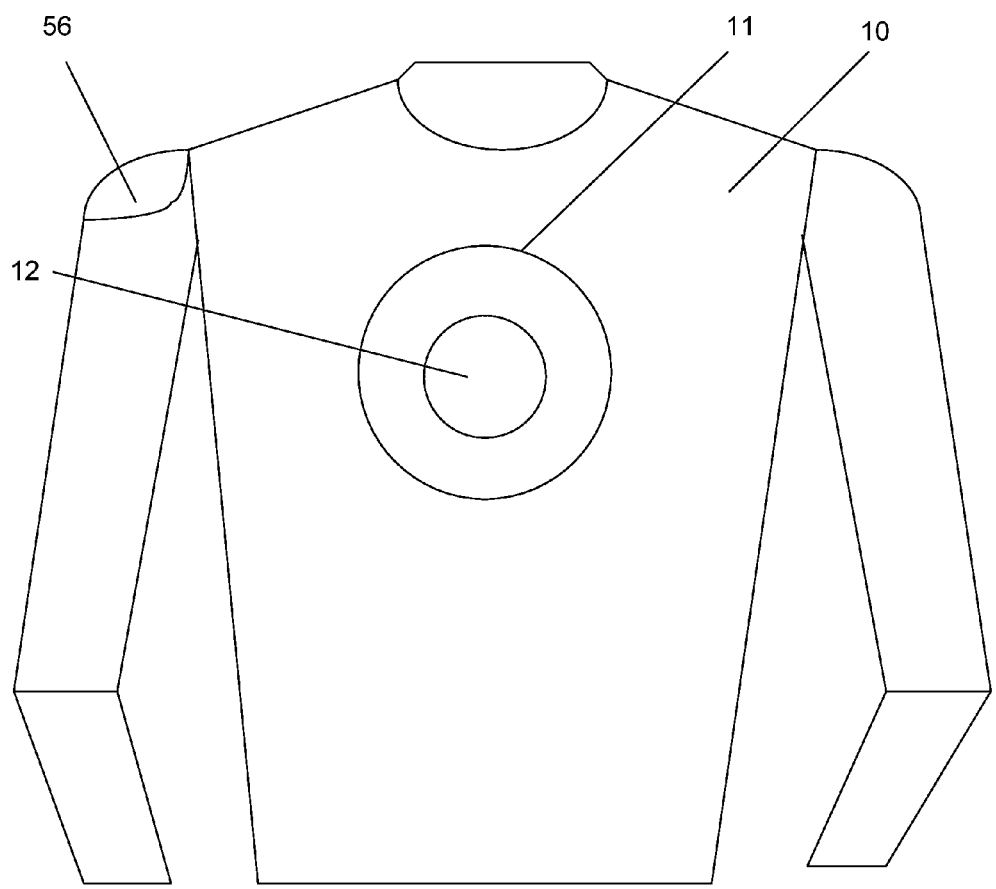
FIG. 1 is a back view of one embodiment of the disclosure, application on a motorcycle jacket.

FIG. 1 shows one embodiment of the disclosure. A motorcycle jacket 10 may be provided with a deceleration rate indicator apparatus 11 on a back panel thereof. As will be described in greater detail below, the apparatus 11 includes a visible lighting mechanism 12 having one or more lights. The apparatus 11 may be mounted anywhere on the back of the motorcycle jacket 10 and is shown in the present embodiment on an upper, center portion of the back panel. In one embodiment the motorcycle jacket 10 may be manufactured with the apparatus 11 already integrated in the jacket. Alternatively, the apparatus 11 may be manufactured and sold separate from the motorcycle jacket 10 and attached afterward.

Figure 6:
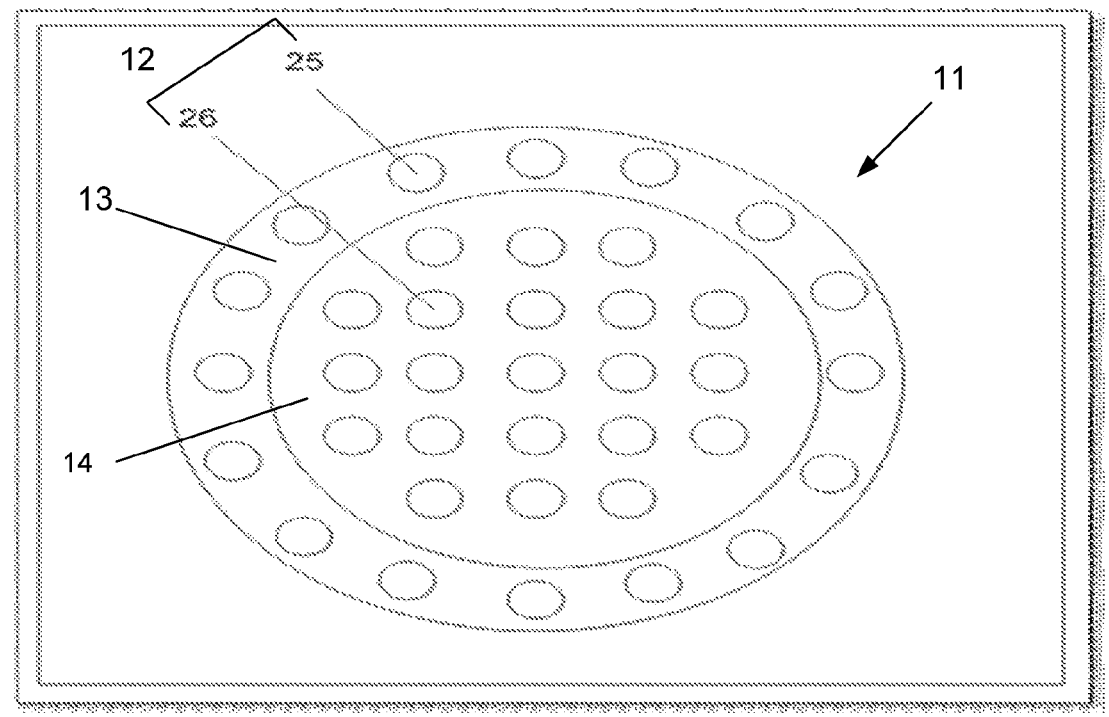
FIG. 6 is a front view of the apparatus illustrating one configuration of a lighting mechanism.

FIG. 6 illustrates one configuration of the apparatus 11. Here, the apparatus 11 is shown having a circular configuration, however, the apparatus 11 may be adapted to other shapes and sizes. The lighting mechanism 12 may include one or more lights to improve the visibility of the apparatus 11. For example, the lighting mechanism 12 may include a first section 13 having a plurality of lights 25 and a second section 14 having a plurality of lights 26. The first section 13 may be concentric with the second section 14. The lights 25 and 26 of first and second sections 13 and 14, respectively, may be designed in any shape with any sizes and number of lights. In addition, there may be additional sections of lights. It is preferably that the arrangement of the sections of lights has a combined area of at least 113 $cm^2$ and up to 300 $cm^2$ for users of non-enclosed vehicles, such as motorcycles, jet skis or snowmobiles to meet regulatory requirements. The lights 25 and 26 may have high luminance red-amber automotive grade surface mount light emitting diodes (LEDs) meeting SAE/ECE/JIS automotive color requirements. These LEDS are mounted on a PCB board. The indicators could be mounted on the visible part of the apparatus 11 and the supporting electronics are on the reverse side. The number of LEDs may be determined by luminous output requirements, power available, and physical size. Other aspects of the lighting mechanism can be varied for different driving situations or to meet different market, regulatory requirements and applications. The color, flash rate, size and brightness of the lighting mechanism may be varied to meet these different requirements.

Figure 9:
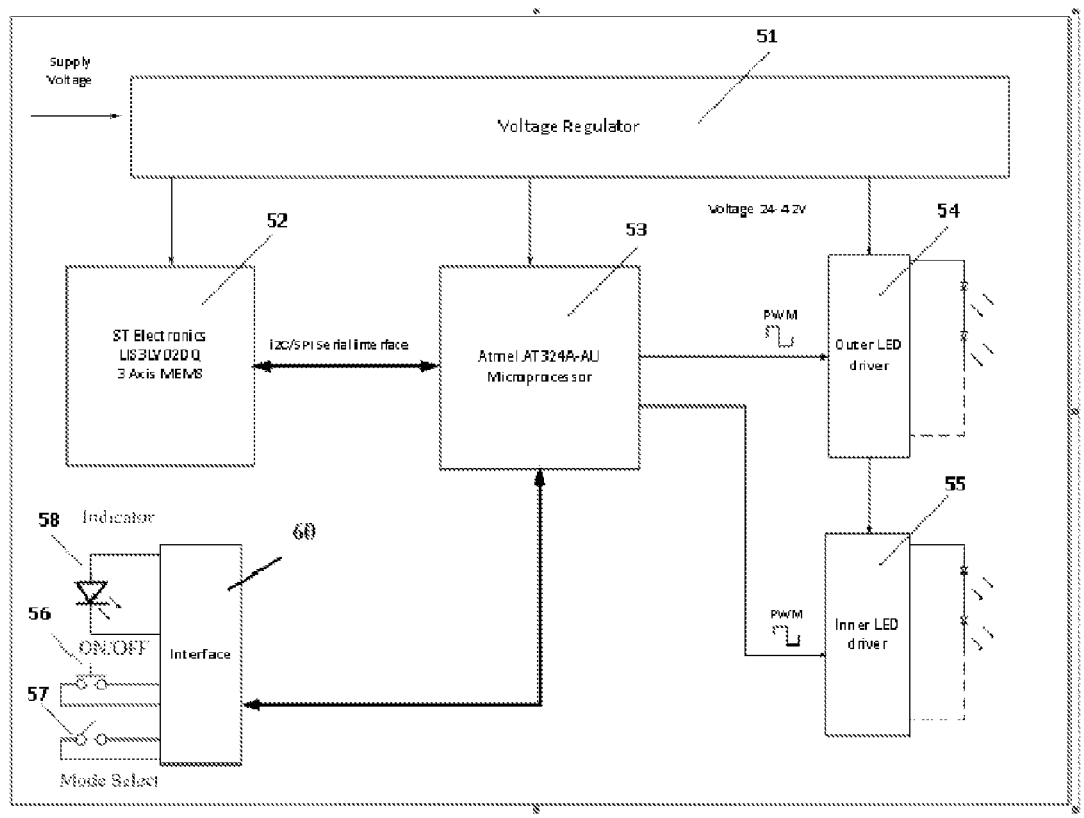
FIG. 9 is a processor level electrical block diagram of the apparatus.

FIG. 9 illustrates the electrical components of the deceleration rate indicator apparatus 11. Supporting electronics include a voltage regulator 51, a 3-axis Microelectromechanical (MEMS) sensor 52, a microprocessor 53, a first section LED driver 54, and a second section LED driver 55. The voltage regulator 51 regulates the supply voltage with a range of voltage 3V to 14V to the 3.5 Vdc for the MEMS 52 and the microprocessor 53 and 42 Vdc for the first section 54 and second section LED string driver 55. It may also be designed to be protected from over-voltage and resettable over-current protection. The supporting electronics communicates with a user interface 60. The user interface 60 includes an ON/OFF switch 56 and a mode switch 57. Both the ON/OFF switch 56 and the mode switch 57 are designed to be large membrane type switches that may be provided on the left chest or left shoulder area of the user. The large switch is designed to operate while the user is wearing gloves and lights up to confirm to the user that the system is activated.

As discussed earlier, the first section lights 25 and second section lights 26 are preferably LEDs designed for automotive application. A flexible printed circuit board (PCB) is utilized to maintain the flexibility of a traditional jacket, although a conventional PCB could also be used. A first section (visible) of the apparatus 11 is populated with lights 25 and 26, while a second section (not shown) holds the control circuit, LED driver circuits and connector. The first and second section may be located separate from each other or together. The first section lights 25 may include LEDs that are designed to be brighter and visible from at least 150 meters. The first section 13 of lights 25, with ultra bright LEDs, emits more heat and activates when the user is decelerating or stopped, and is therefore designed for lower duty cycle. The second section 14 of lights 26 may include LEDs that are designed to run at higher duty cycle. The main purpose of the second section 14 of lights 26 is to serve as running lights to improve visibility of the user. The second section 14 of lights 26 complements the first section 13 of lights 25 by increasing the intensity of the LEDs with increased deceleration.

Figure 7:
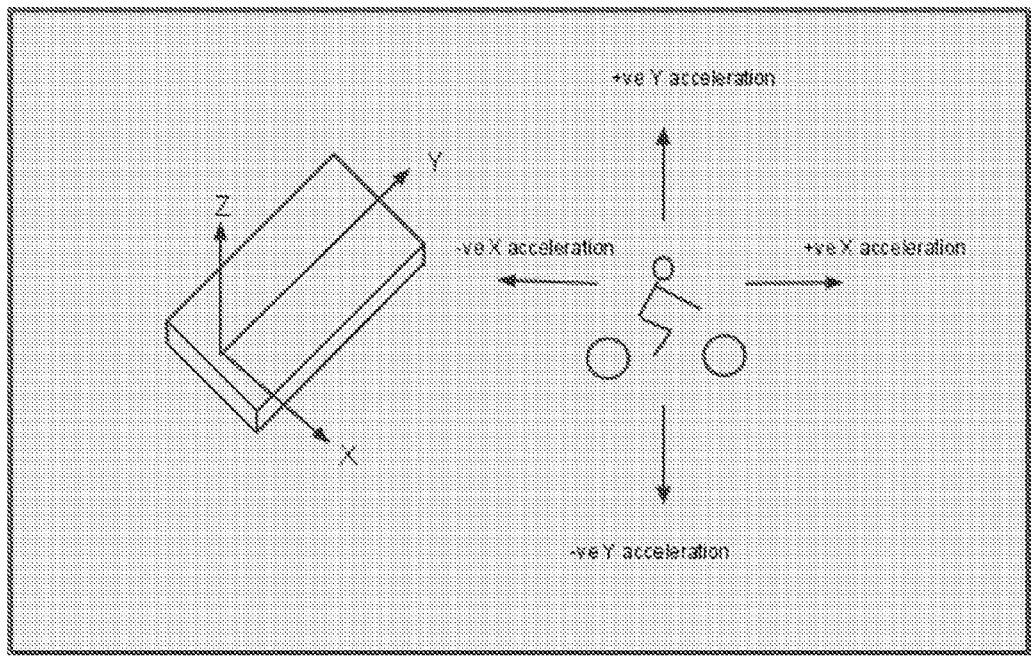
FIG. 7 is an accelerometer axis diagram of the apparatus.
Figure 8:
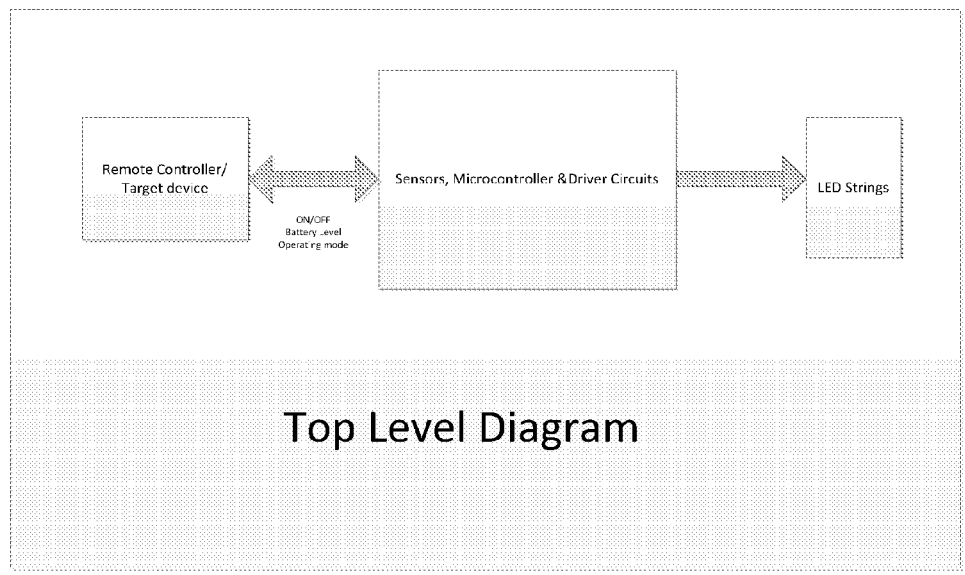
FIG. 8 is a top level electrical block diagram of the apparatus.

FIG. 7 shows an axis and orientation of an accelerometer of the apparatus 11. The MEMS sensor 52 (FIG. 9) of apparatus 11 is a common type of an accelerometer. The accelerometer may be a low g, low power inertial sensor. A 3-axis digital accelerometer is utilized in this embodiment, but an analog 2-axis accelerometer could also be used. FIG. 7 shows how the axis of the MEMS sensor 52 relates to the user. The orientation axis is calibrated during the initialization sequence, which will be explained in greater detail below.

FIG. 9 is a top level diagram that shows how information data flows in the apparatus 11. The ON/OFF switch 56 and the mode switch 57 allow the user to turn the apparatus 11 on and off, as well as adjust the different modes of operation available to the user. Since the mode of operation is programmed on the microprocessor 53, it could be updated with improved algorithm for different applications.

Figure 2:
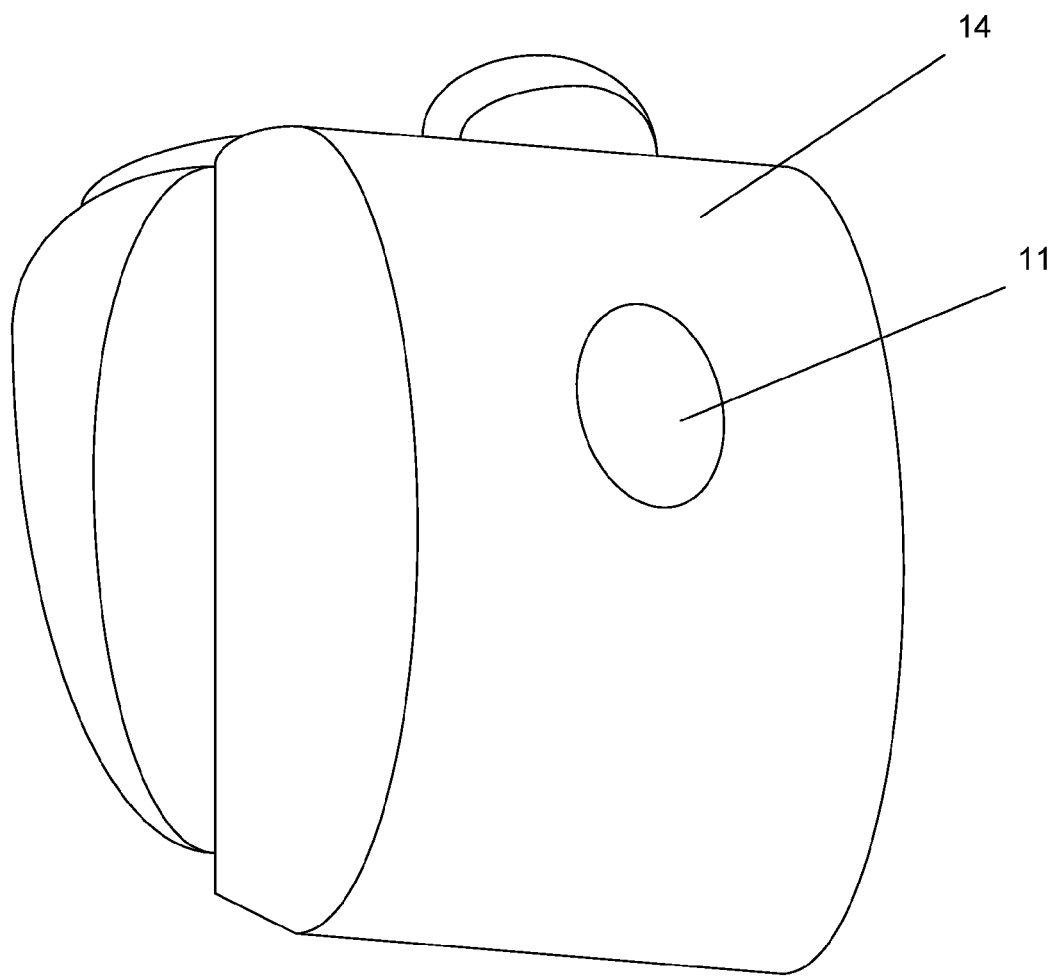
FIG. 2 is a perspective view of another embodiment of the disclosure, application on a backpack.
Figure 3:
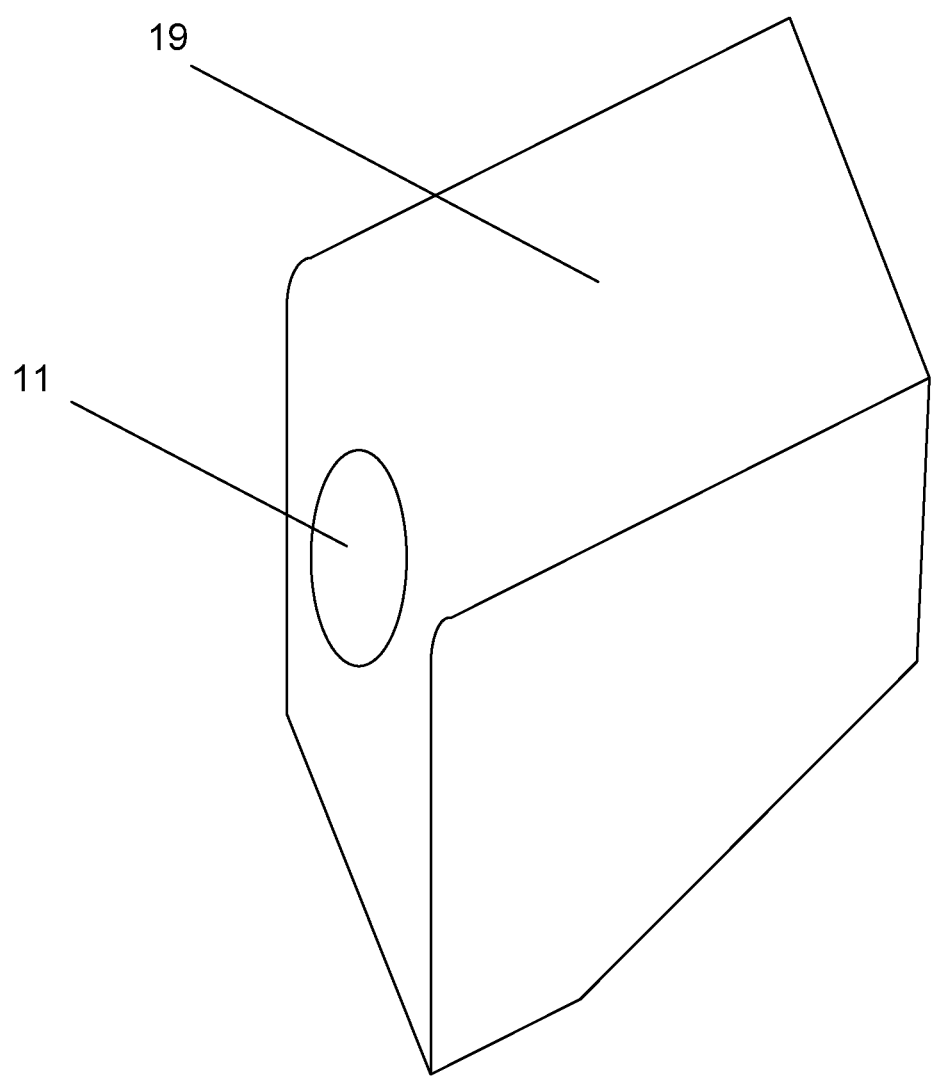
FIG. 3 is a perspective view of still another embodiment of the disclosure, application on a motorcycle trunk.
Figure 4:
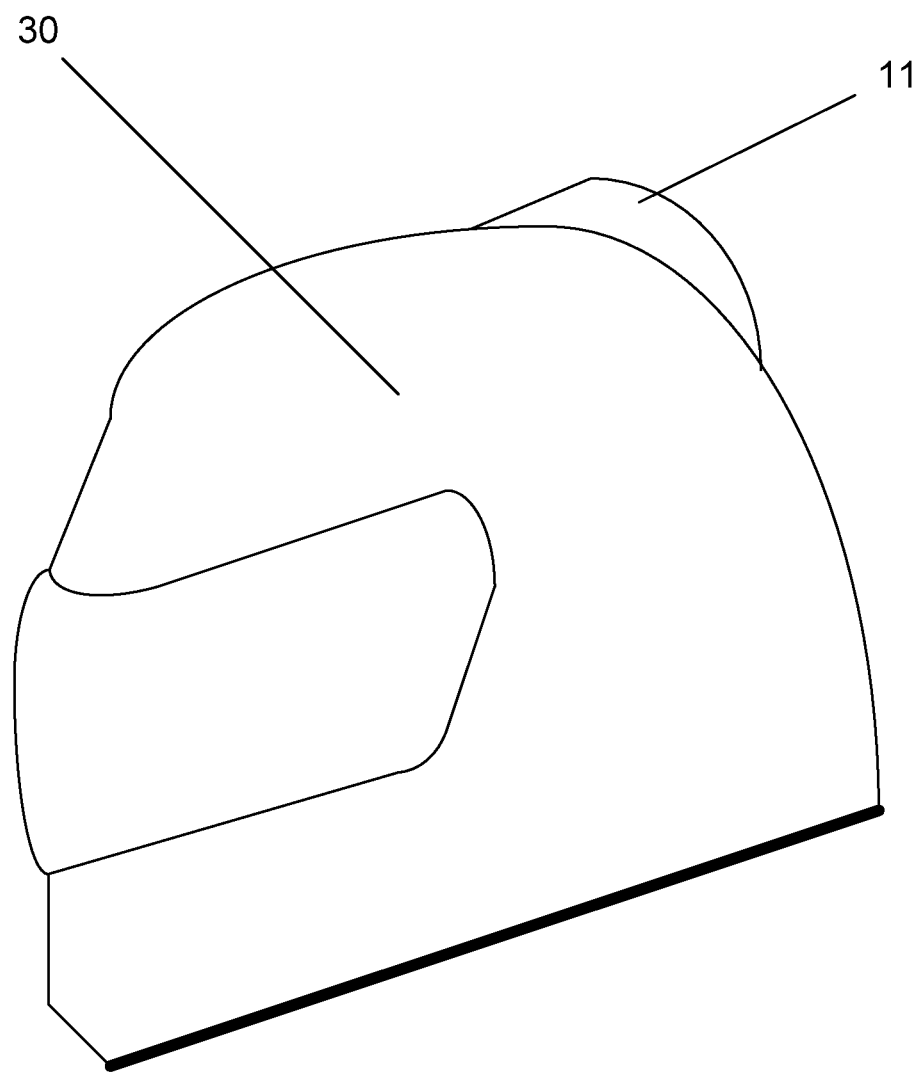
FIG. 4 is an embodiment of the disclosure, mounted on a helmet.
Figure 5:
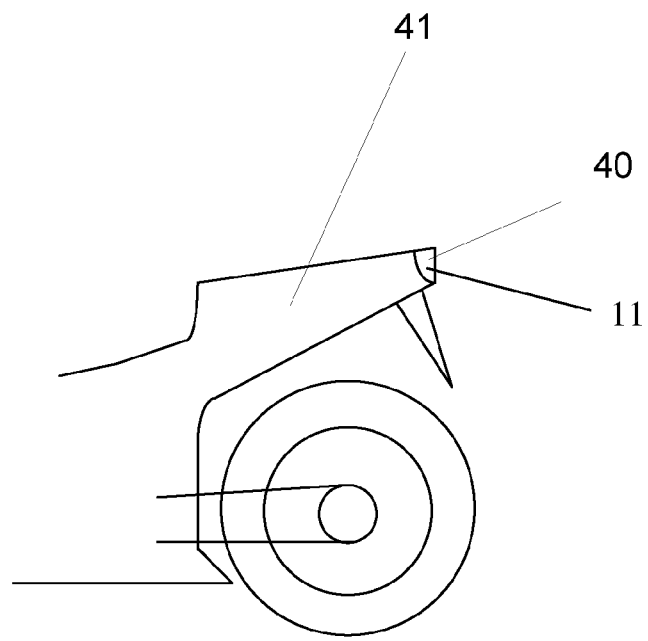
FIG. 5 is a perspective view of another embodiment of the disclosure, application on a motorcycle.

The deceleration rate indicator apparatus 11 need not be limited to a motorcycle jacket 10. FIGS. 2-5 show alternative implementations of the apparatus 11. In FIG. 2, the apparatus 11 is mounted on the front panel of a bag, such as a backpack 15. In FIG. 3 the apparatus 11 is mounted on a motorcycle trunk 19. In this embodiment, the apparatus 11 could be wired to the existing motorcycle wiring or as battery powered standalone. In FIG. 4, the apparatus 11 is shown mounted on a helmet 30. The apparatus 11 could be marketed as an aftermarket part or designed as original equipment. In FIG. 5, the apparatus is shown mounted on a motorcycle 41. Apparatus 11 is housed in housing 41.

Operation

Initialization Sequence

Figure 10:
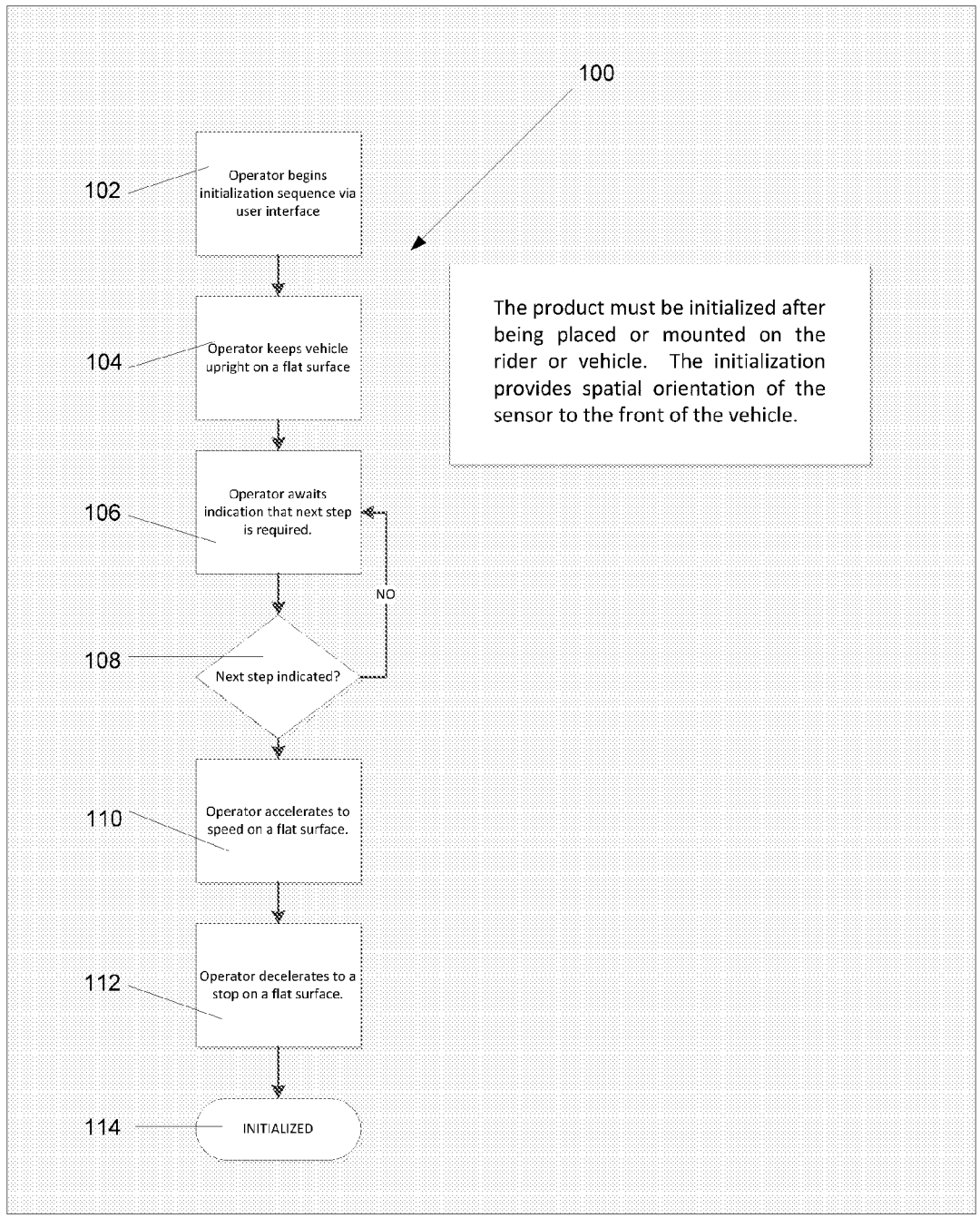
FIG. 10 is a flow chart of an initialization sequence of the apparatus.

The apparatus 11 requires initialization or calibration before it is used for the first time. FIG. 10 is a flow diagram illustration an initialization sequence 100 for the apparatus 11. At step 102, the user begins initialization of the apparatus. The user is instructed to enter the initialization sequence the first time the apparatus 11 is used on a particular vehicle. Initialization is performed on a flat surface with the user maintaining the vehicle upright on a flat surface at step 104. The first step is for the apparatus 11 to sample deceleration rate in the x, y, and z axis when the vehicle is stationary with the engine on. The accelerometer 52 samples up to 100 samples on each axis and provide the data to the microprocessor 53. The apparatus 11 signals to the user that it is ready for the step 110 in step 108 by flashing LED 58 twice in quick succession. At step 110, user accelerates to a determined speed up to 50 km/h and maintains speed for up to 5 seconds. The accelerometer 52 samples up to 100 samples on each axis and provides the data to the microprocessor 53. At step 112, the user decelerates to a stop in a safe manner. The accelerometer 52 samples up to 100 samples on each axis and provides the data to the microprocessor 53. The data is stored in the digital microprocessor 53 memory or an external memory can be used. The data serves as spatial orientation to the front of the vehicle.

Normal Operation

Figure 11:
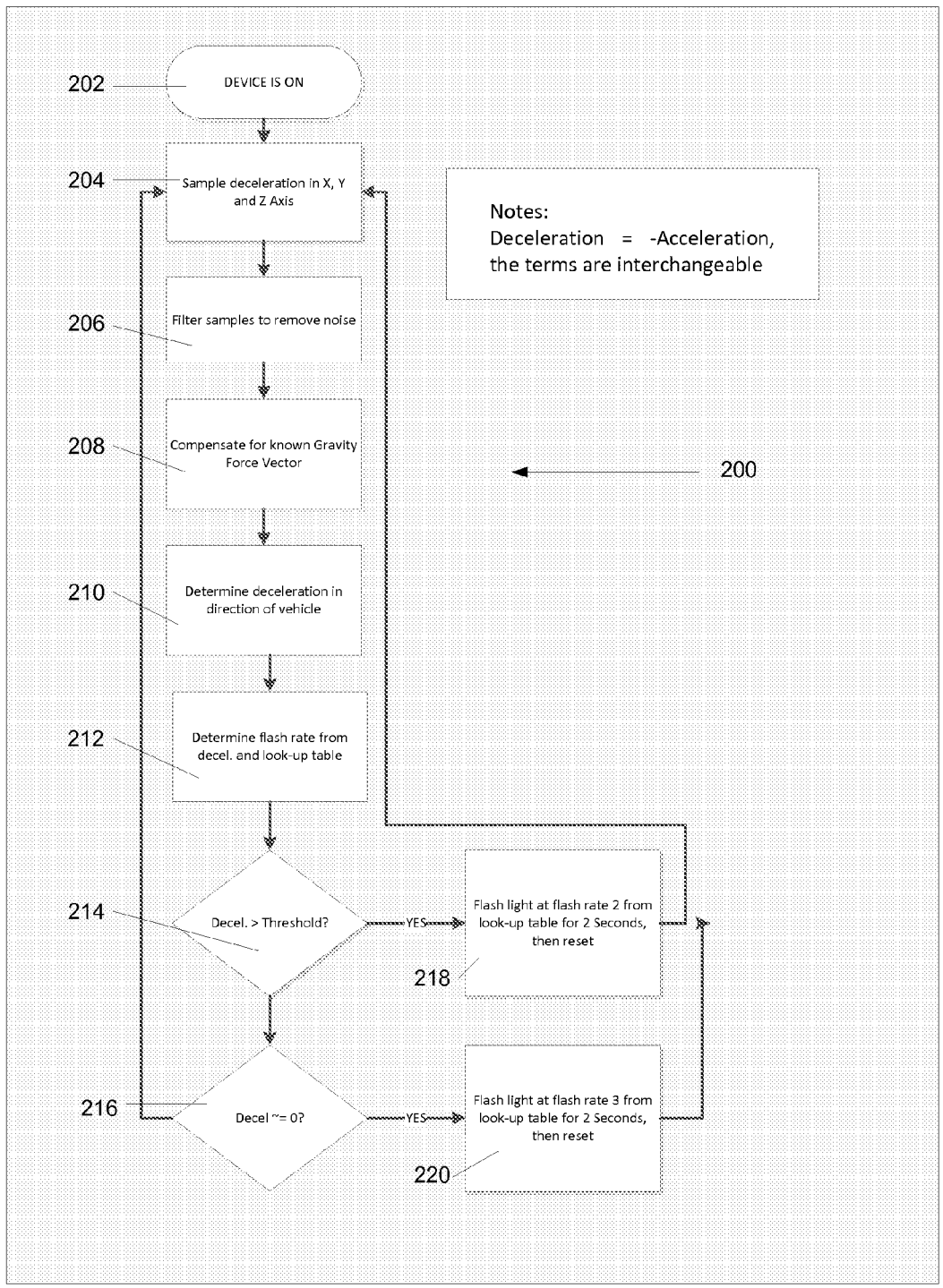
FIG. 11 is a flow chart of an operation sequence of the apparatus.

FIG. 11 is a flow diagram illustration an operating sequence 200 for the apparatus 11. The apparatus 11 is activated when user plugs in the cable battery and presses the membrane switch 56 in step 202. In step 204, the apparatus 11 starts sampling deceleration rate in x, y, and z axes. In step 206, the data is filtered with the offset and gain based on data that was collected in the initialization sequence 100. In step 208 the microprocessor 53 determines vector gravity and calculates a range of moving vectors that are 45° wide and at least 60° to the gravity vector. In step 210, the microprocessor determine the deceleration rate of the in the moving direction of the motorcycle, or other vehicle. In step 212 the processor 53 then compares the resulting moving axes against a look up table values to determine the flash rate of the light. If deceleration rate exceeds the threshold the next step is 218 and the microprocessor flashes the lights at the rate based on the stored look up table. If deceleration rate does not exceed the threshold, the microprocessor makes a determination if the motorcycle is stopped or moving constantly by comparing deceleration rate to data acquired during the initialization sequence 100. The apparatus 11 determines the motorcycle is stopped if there are no deceleration in any axes except for the gravity vector. If the motorcycle is determined to be stopped instead of moving at constant speed the light the next step is step 220 where the light flashes for 2 seconds before resetting itself. A status table is simplified below.

| Action | First section Region Lights | Second section Region Lights |
| --- | --- | --- |
| Stopped | Flash at constant rate | On |
| Moving in constant speed | Off | On |
| Accelerating | Off | On |
| Decelerating | Flash at rate proportional to deceleration rate | Increased brightness proportional to deceleration rate |

Automatic Mode Switch

Figure 12:
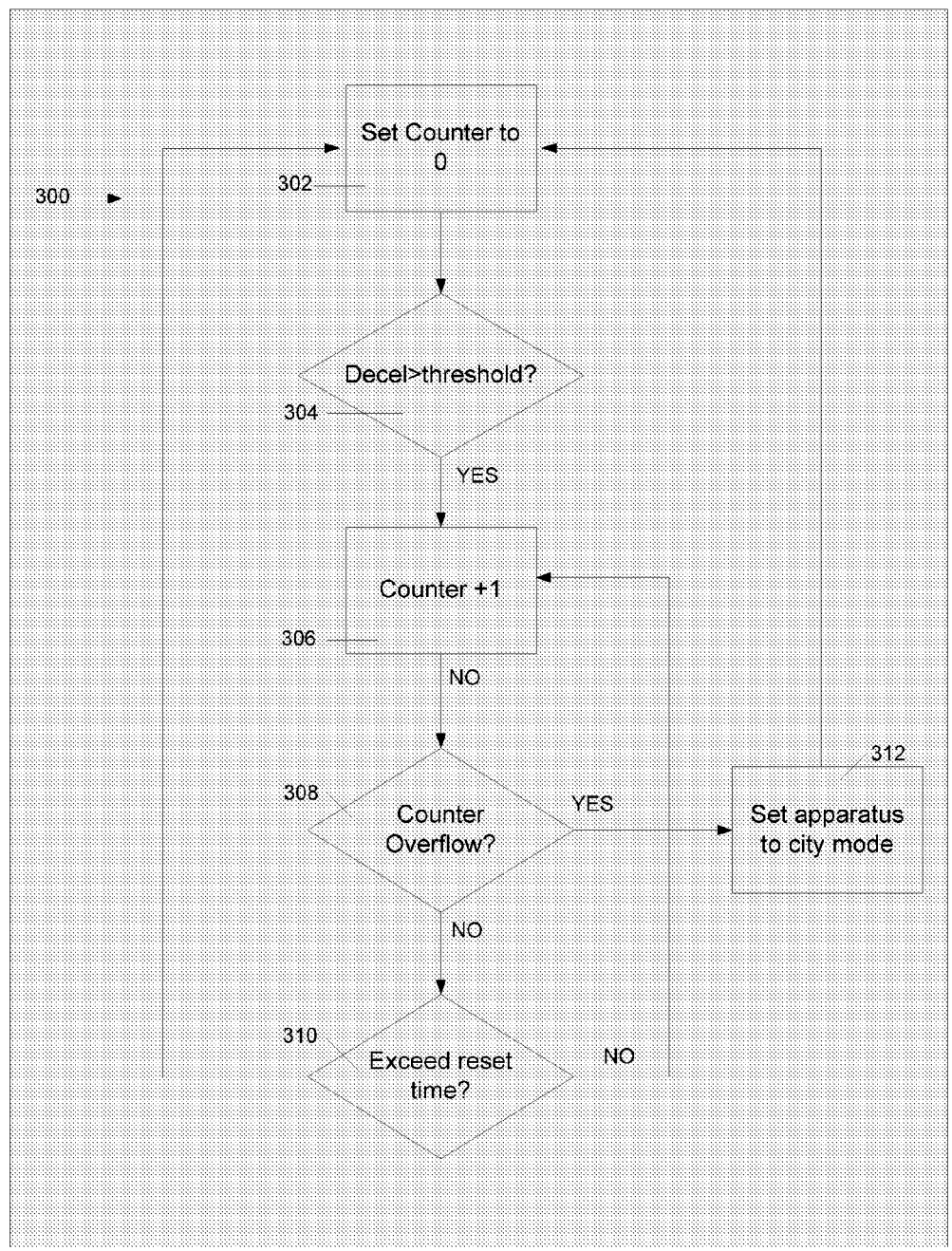
FIG. 12 is a flow chart of a city mode sequence of the apparatus.

User can select the different modes for the apparatus. The apparatus 11 can also be set to automatically switch between City Mode and Highway Mode. FIG. 12 is an interrupt sequence 300 for the apparatus 11. The apparatus 11 sets the counter to 0 during power up in step 302. If the deceleration exceeds the set threshold in step 304 an interrupt service routine is called and the counter is increased by 1 in step 306. In step 308 the counter overflow is reviewed. The counter overflow indicates that apparatus deceleration count has exceeded and the user is likely riding in stop and go traffic in a city. If the counter overflowed the apparatus 11 is set to City Mode in step 312 and the counter is set back to 0 in step 302. If the counter does not overflow then the City Mode reset time is reviewed. If the user has not decelerated exceeding the set threshold this indicates that the user is likely moving on a highway and the apparatus 11 remains in the default mode which is the Highway mode and sets the counter back to 0 in step 302. The sensitivity of the mode can be software adjusted as City Mode overflow counter value and City Mode reset time can be modified.

City Mode

In city mode the LED brightness is set to low and the brake lights only functions when stopped (flash at 1-2 Hz) and when decelerating at a rate greater than 5 m/s^2 (flash at 10 Hz). The user may select the city mode or when set to automatic mode the apparatus switches mode when the deceleration counter exceeds the threshold set.

Highway Mode

In highway mode the LED brightness is set to high (200-500 millicandela) and the full deceleration rate table is utilized.

Third Brake Mode

When integrated as on OEM in Motorcycle or automotive brake lights power conservation is less of an issue but the system receives two inputs from the vehicle. Running lights and traditional brake lights. Both LED brightness are software adjusted to be brighter. The user may also set this mode when concerns for additional visibility exceed concerns for battery conservation such as in bad weather condition.

Minimum threshold deceleration rate is 2 m/s^2 for a minimum of 0.25 seconds. (i.e. the moving average minimum). Once the minimum threshold is reached the light will flash based on the look up table below for 2-5 seconds. Minimum threshold deceleration rate is software adjustable. Flash rate ranges from 1-15 Hz. Table below shows flash rate and its corresponding deceleration rate. All values in the look up table below are software adjustable.

| Deceleration Rate | Flash rate | Typical event |
|---|---|---|
| 0, stopped | 1 Hz | Stopped at light |
| 2 m/s^2, slowing down/ | 2 Hz | Engine Braking |
| 5 m/s^2 to 9 m/s^2 deceleration rate, active braking | 5-9 Hz | Driver applies controlled pressure to brake smoothly |
| Greater than 9 m/s^2, Emergency Braking | 15 Hz | Driver is braking to avoid collision |

The table below shows software adjustable values. Different manufacturers of apparel may wish to customize how the apparatus behaves to suit the need and preference of their customers.

| Item | Description |
|---|---|
| Flash time | Period of flash time when minimum deceleration threshold reached |
| Min Deceleration rate | Minimum deceleration threshold |
| Flash rate (stopped) | Flash rate when stopped |
| Flash rate (slowing down) | Flash rate when slowing |
| Flash rate (active braking) | Flash rate when active braking |
| Flash rate (Emergency braking) | Flash rate when emergency braking |
| Highway mode running light Brightness | Set duty cycle of the running light in highway mode |
| Highway mode brake/running light intensity ratio | Default value is 2.5 to 1. Brake light duty cycle is a multiply of the running light brightness. |
| City mode running light Brightness | Set duty cycle of the running light in city mode |
| City mode brake/running light intensity ratio | Default value is 2.5 to 1. Brake light duty cycle is a multiply of the running light brightness |
| City Mode overflow counter value | Set number of deceleration occurrence before apparatus switches to city mode |
| City Mode reset time | Set time before overflow counter is reset to 0 |

Advantages of the apparatus 11 include a simple standalone unit that can easily be integrated into apparel or other accessories to provide more perceptible indication to a following vehicle that the user has begun a deceleration event. Drivers following a user with the present apparatus receive indication of the user's deceleration and the rate of deceleration and may, therefore, make better driving decisions. Since the apparatus 11 detects deceleration by using an electromechanical sensor, the apparatus 11 warns following vehicles of deceleration when the user releases throttle or uses engine braking. The Motorcycle Safety Foundation encourages motorcyclists to constantly flash their brake lights when stopped to increase visibility, however, many fail to do so because of the effort required.

The apparatus 11 can be adapted for safety apparel and accessories or incorporated into conventional automotive brake lights. The only modification required when integrating in an existing brake light is to provide a low voltage dc source and this modification is not needed if an auxiliary battery power is used. Since the apparatus 11 is a standalone unit, the apparatus 11 can be marketed in the aftermarket industry or original equipment manufacturer. Bicyclist, snowmobile riders, jet-ski riders all can benefit from deceleration indicator. Thus several advantages of one or more aspects are to provide improved decelerating indication, improved visibility and increased time for drivers to react as deceleration by releasing throttle or downshifting typically precedes actual braking.

While the above description contains many specificities, these should not be construed as limitations on the scope of any embodiment, but as exemplifications of various embodiments thereof. Many other ramifications and variations are possible within the teachings of the various embodiments, for example, the apparatus could be applied for sports such as skiing, bicycling, etc. Thus the scope should be determined by the appended claims and their legal equivalents, and not by the examples given.

The above descriptions are the embodiments to exemplify the present disclosure to enable the person skilled in the art to understand, make and use embodiments of the present disclosure. This description, however, is not intended to limit the scope of the present disclosure. Any equivalent modification and variation according to the spirit of the present disclosure is to be also included within the scope of the claims stated below.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. The scope of protection is limited solely by the claims. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. A method for providing deceleration rate information of a user operating a vehicle, the method comprising:
   providing an apparatus including an accelerometer, a processor coupled to the accelerometer, and a lighting mechanism coupled to and controlled by the processor;
   initializing the apparatus, wherein initializing the apparatus includes:
      sampling a deceleration rate of the vehicle while the engine is on and the vehicle is stationary to obtain a first data set;
      sampling a deceleration rate of the vehicle while the vehicle maintains a predetermined speed to obtain a second data set;
      sampling a deceleration rate of the vehicle while the vehicle decelerates to a stop to obtain a third data set; and storing the first data set, the second data set, and the third data set in the processor;
sampling a deceleration rate of the vehicle;
comparing the deceleration rate of the vehicle to a threshold value stored in the processor; and
varying operation of the lighting mechanism if the deceleration rate of the vehicle is greater than the threshold value.

2. The method according to claim 1, wherein varying operation of the lighting mechanism includes changing at least one of a pattern, a color, a flash rate, a size, or a brightness of the lighting mechanism.

3. The method according to claim 1, further comprising selecting a driving mode from at least two driving modes based on the comparison of the deceleration rate and the threshold value.

4. The method according to claim 3, wherein the at least two driving modes includes a city mode and a highway mode.

5. The method according to claim 4, wherein selecting the driving mode from the at least two driving mode is automatically selected by the processor, wherein the processor changes from a default mode when the processor determines that the vehicle has decelerated in frequency exceeding a set amount in a given period of time, and where the processor resets the default mode when the processor determines that the vehicle has not decelerated in frequency exceeding the set amount in the given period of time.

6. The method according to claim 5, wherein the default mode is the highway mode.

7. A method for providing deceleration rate information of a user operating a vehicle, the method comprising:
providing an apparatus including an accelerometer, a processor coupled to the accelerometer, and a lighting mechanism coupled to and controlled by the processor;
sampling a deceleration rate of the vehicle;
comparing the deceleration rate of the vehicle to a threshold value stored in the processor; and
varying operation of the lighting mechanism if the deceleration rate of the vehicle is greater than the threshold value;
selecting a driving mode from at least two driving modes based on the comparison of the deceleration rate and the threshold value, wherein the at least two driving modes includes a city mode and a highway mode, wherein selecting the driving mode from the at least two driving mode is automatically selected by the processor, wherein the processor changes from a default mode when the processor determines that the vehicle has decelerated in frequency exceeding a set amount in a given period of time, and where the processor resets the default mode when the processor determines that the vehicle has not decelerated in frequency exceeding the set amount in the given period of time.

8. The method according to claim 7, wherein varying operation of the lighting mechanism comprises changing at least one of a pattern, a color, a flash rate, a size, or a brightness of the lighting mechanism.

9. The method according to claim 7, wherein the default mode is the highway mode.

10. The method according to claim 1, further comprising initializing the apparatus.

11. The method according to claim 10, wherein initializing the apparatus comprises sampling a deceleration rate of the vehicle while the engine is on and the vehicle is stationary to obtain a data set.

12. The method according to claim 10, wherein initializing the apparatus comprises sampling a deceleration rate of the vehicle while the vehicle maintains a predetermined speed to obtain a data set.

13. method according to claim 10, wherein initializing the apparatus comprises sampling a deceleration rate of the vehicle while the vehicle decelerates to a stop to obtain a data set.

14. The method according to claim 11, further comprising storing the data set in a non-transient data memory.

15. The method according to claim 12, further comprising storing the data set in a non-transient data memory.

16. The method according to claim 13, further comprising storing the data set in a non-transient data memory.

17. The method according to claim 10, wherein initializing the apparatus comprises:
sampling a deceleration rate of the vehicle while the engine is on and the vehicle is stationary to obtain a first data set; and
sampling a deceleration rate of the vehicle while the vehicle maintains a predetermined speed to obtain a second data set.

18. The method according to claim 10, wherein initializing the apparatus comprises:
sampling a deceleration rate of the vehicle while the engine is on and the vehicle is stationary to obtain a first data set; and
sampling a deceleration rate of the vehicle while the vehicle decelerates to a stop to obtain a second data set.

19. The method according to claim 10, wherein initializing the apparatus comprises:
sampling a deceleration rate of the vehicle while the vehicle maintains a predetermined speed to obtain a first data set; and
sampling a deceleration rate of the vehicle while the vehicle decelerates to a stop to obtain a second data set.

20. The method according to claim 17, further comprising storing the first data set and the second data set in a non-transient data memory.

* * * * *